United States Patent [19]

Douaud et al.

[11] Patent Number: 4,549,513

[45] Date of Patent: Oct. 29, 1985

[54] METHOD FOR THE AUTOMATIC ADJUSTMENT OF THE IGNITION INITIATION CONTROL TIME IN AN INTERNAL COMBUSTION ENGINE

[75] Inventors: André Douaud, Puteaux; Joseph Rialan, Meudon, both of France

[73] Assignee: Institut Francais Du Petrole, Rueil-Malmaison, France

[21] Appl. No.: 420,553

[22] Filed: Sep. 20, 1982

Related U.S. Application Data

[63] Continuation-in-part of Ser. No. 309,168, Oct. 6, 1981.

[30] Foreign Application Priority Data

Jul. 26, 1978 [FR] France .................. 78 22542

[51] Int. Cl.⁴ .............................................. F02P 9/04
[52] U.S. Cl. ..................... 123/425; 123/435; 123/488; 123/426
[58] Field of Search ................ 123/425, 435, 488, 426

[56] References Cited

U.S. PATENT DOCUMENTS

| | | | |
|---|---|---|---|
| 4,002,155 | 1/1977 | Harned | 123/425 |
| 4,116,173 | 9/1978 | McDougal | 123/425 |
| 4,120,272 | 10/1978 | Douaud | 123/425 |
| 4,130,097 | 12/1978 | Ford | 123/425 |
| 4,261,313 | 4/1981 | Iwata | 123/425 |
| 4,269,154 | 5/1981 | Iwata | 123/425 |
| 4,285,315 | 8/1982 | Douaud | 123/425 |
| 4,300,503 | 11/1981 | Deteris | 123/425 |
| 4,356,551 | 10/1982 | Iwase | 123/425 |
| 4,463,729 | 8/1984 | Bullis | 123/501 |

FOREIGN PATENT DOCUMENTS

| | | | |
|---|---|---|---|
| 2006332 | 5/1979 | United Kingdom | 123/426 |
| 1563361 | 3/1980 | United Kingdom | 123/426 |
| 2060061 | 4/1981 | United Kingdom | 123/426 |
| 2069601 | 8/1981 | United Kingdom | 123/426 |

Primary Examiner—Ronald B. Cox
Attorney, Agent, or Firm—Millen & White

[57] ABSTRACT

A method is provided for the automatic control of the ignition time in a spark ignition engine or the injection time in a compression-ignition engine wherein at least one typical phenomenon of the running conditions of the engine, such as the occurrence of the peak pressure in the cylinder within a certain angular interval of the crankshaft, or the passage of the flame front through a reference position of the combustion chamber is detected, and the detected measurements have an aleatory character. This method comprises the determination of a statistical value representative of at least P validated measurements, of said phenomenon occurring during at most Q cycles, and the use of said statistical value to modify the control time of the combustion initiation so that said statistical value takes a predetermined value corresponding to the desired running conditions.

16 Claims, 1 Drawing Figure

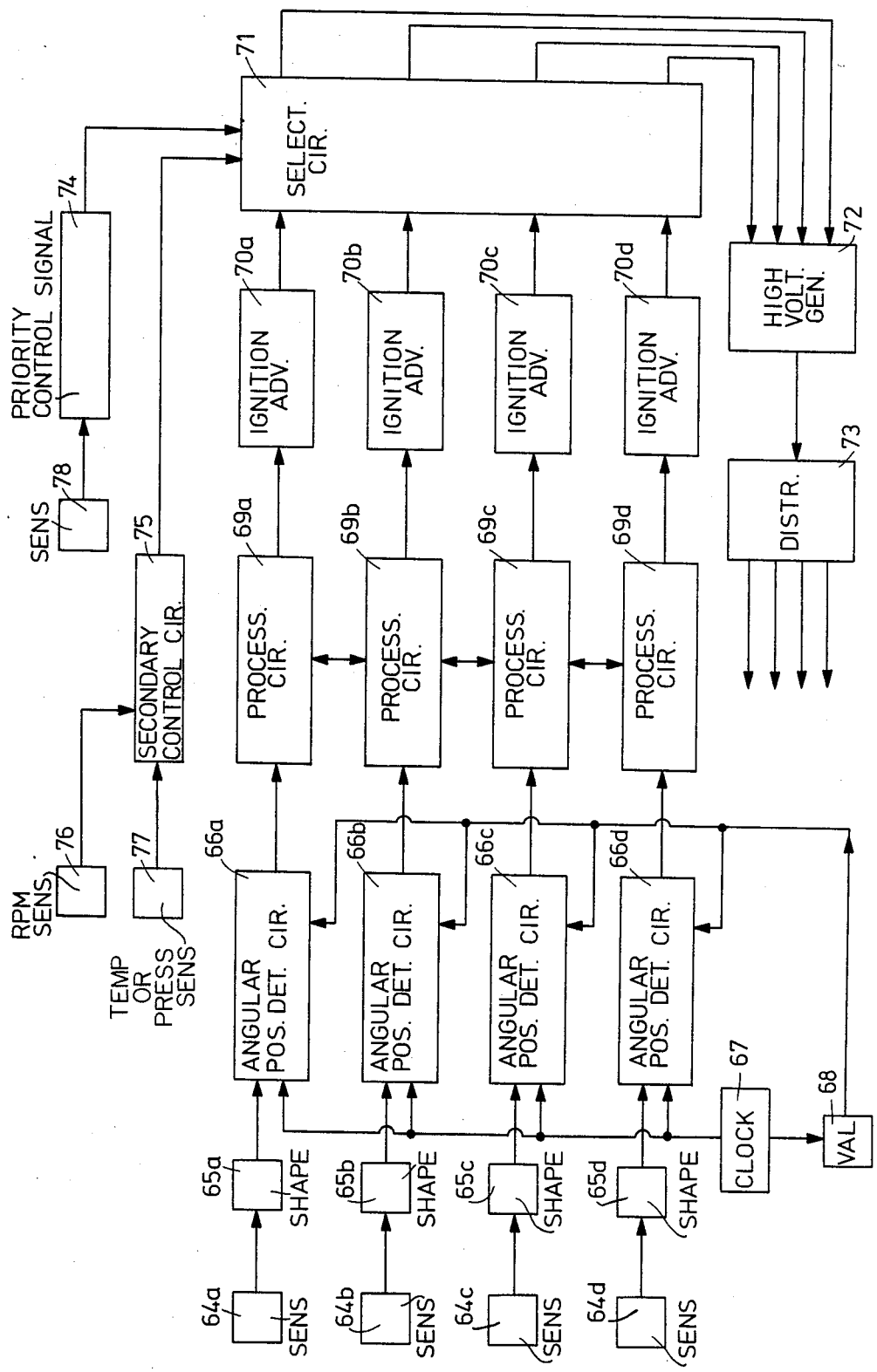

METHOD FOR THE AUTOMATIC ADJUSTMENT OF THE IGNITION INITIATION CONTROL TIME IN AN INTERNAL COMBUSTION ENGINE

BACKGROUND OF THE INVENTION

This application is a continuation-in-part of Ser. No. 309,168 filed Oct. 6, 1981 and now pending.

This invention has for object an improved method for the automatic regulation of an internal combustion engine with a view to achieve and to maintain predetermined running conditions, particularly in order to ensure a good combustion in the cylinders of the engine. This regulation is effected by making use of signals, produced by sensors measuring phenomena or events occurring in relation with the combustion, for controlling the initiation time thereof. For this reason, the operating conditions obtained by controlling the moment of initiation of the combustion from data measuring the quality thereof are referred to as a closed loop operation since the effect of the change in the time of initiation of the combustion on the development thereof will result in a change of the signals generated by the one or more sensors, which in turn will result, at the next cycle, in a new change of said initiation moment and this will continue until the conditions of the combustion development conform with the contemplated goals.

The method according to the invention for the automatic control and regulation of the time of initiation of combustion is applicable to the internal combustion engines comprising at least one cylinder equipped with means for identifying the angular position of the drive shaft corresponding to the occurrence in the cylinder of a characteristic phenomenon or event of the running conditions of the engine, when this phenomenon or event and/or its detection has an aleatory character.

The time, of control of the combustion initiation in a cylinder generally corresponds, either to the ignition advance measuring the angular interval, in degrees of crank-shaft rotation angle, between the top dead center and the position of the crank-shaft at the time where the spark-plugs are fed with high voltage, in the case of the spark-ignition engine, or to the injection advance measuring the angular interval in degrees of crank-shaft rotation angle, between the top dead center and the position of the crank-shaft at the time where the fuel is injected in the cylinders, in the case of a compression-ignition engine.

SUMMARY OF THE INVENTION

According to the invention, for each of the cylinders equipped with means for detecting the phenomenon characterizing the engine running conditions, there is measured the angular position of the drive shaft at the time of occurrence the characteristic phenomenon of the running conditions of the engine, then, when at least a number P of validated measurements has been obtained during a number of cycles at most equal to a predetermined value Q, there is determined a statistical angular value representative of the validated measurements and, from said statistical value, there is calculated and applied to the control means a modified value of the controlled time for the initiation of combustion, i.e., of the advance, in such a manner that said statistical value equals a predetermined value V.

This predetermined value V, as well as the number P or the number Q, may be either fixed values or values depending on a parameter acting on the running conditions of the engine such as its running speed, its charge, its noise, the pollutant content of the exhaust gases, the nature of the fuel, a temperature of the engine.

When the engine comprises several cylinders, at least one of which is equipped with means for the detection of the characteristic phenomenon of the engine running conditions, the statistical value elaborated from the measurements effected on said cylinder is also used for determining the modified value of the control time of the combustion initiation in the cylinders not equipped with means for the detection of said characteristic phenomenon.

When the engine comprises several cylinders at least two of which are equipped with these detection means, the statistical value elaborated for at least one of the cylinders equipped with detection means is used for controlling the combustion initiation time in another cylinder not equipped with detection means or for which the number of validated measurements of said characteristic phenomenon have been lower than P during Q cycles.

According to an alternative embodiment of the method of the invention, when in each of the cylinders equipped with the detection means, the detection of the characteristic phenomenon of the engine running conditions have been effected only a number of times lower than P during Q cycles, the advance is given a predetermined value which may optionally be dependent on the value taken by at least one parameter having an effect on the engine running conditions such as its charge, the temperature of the admission gases or other salient temperatures, various pressures measurable on the engine, or in relation with the nature of the motor fuel or with a parameter such as the position of the accelerator which results from the drivers intention. In this case, the system will no longer be controlled from the combustion characteristics and its operation will be called an open loop operation.

The aleatory character of the characteristic phenomenon of the engine running conditions may consist of, for example, but not limitatively, the occurrence or non-occurrence of the phenomenon itself, its detection or its non-detection and finally, the fact that the characteristic phenomenon of the engine running conditions occurs at variable angular positions of the crank-shaft.

It is possible, according to the invention, to control the different detections as well as the range of the crank-shaft angle values at which they are produced, in order to decide whether they will be validated or rejected.

The selection and the severity of the validation criteria are left to the appraisal of those skilled in the art and may vary from the less severe (the mere occurrence of the detection is sufficient) to the most severe (e.g. occurrence of the detection within a very narrow range).

The use of a statistical value representative of the angular values of the positions of the driving shaft at the moment at which is detected the characteristic phenomenon of the engine running conditions has as an object to avoid the risks resulting from the use of erratic values not representative of the phenomenon to be measured. The retained value must be a value which may be called "normal" and not an exceptional or erratic value. It is this reason why it is necessary to make use of several measurement values, naturally scattered, in order to extract therefrom the so-called "normal" value. Of course, the greater the number of values retained in the statistical population wherefrom is extracted the representative value, the more normal will be the latter. However, a practical limit is found in the necessity to avoid a staggering of the measurements over a period not representative of the present running conditions of the engine and the selection of the minimum population level P of the measurements used to determine a normal value will thus result from a compromise, the retained number P having however to be large enough in order to obtain a good representativity of the phenomenon by permitting reduction of the action of elements external to the phenomenon, whose disturbing effect concerns only certain cycles.

The statistical value retained as representative of the population P of measurements will be, for example, the median or the mode or a mean such as the arithmetical mean, the geometrical mean or a quadratic mean.

The selection of the type of representative value retained for the population of the measurements depends on the nature of the phenomenon to be measured.

The following description refers, by way of example, to two types of characteristic phenomena of the running conditions of the engine. The first one is constituted by the maximum pressure in the cylinder, the second one by the passage of the flame front in a reference position of the combustion chamber.

These phenomena are respectively described, in the case of a spark-ignition engine, in the French Pat. Nos. 2,404,121, 2,475,640, the U.S. Pat. No. 4,153,019 and the French Pat. No. 2,432,097.

These phenomena also occur in compression-ignition engines and, also in this case, they are used for adjusting the control time of the combustion initiation.

These two chracteristic phenomena of the running conditions of the engine are by no way limitative and it will be also possible to apply the method of the invention to the automatic adjustment of the ignition control time based on other phenomena for example, on the end of the combustion phase, as it is described in the French Pat. No. 2,465,635.

Thus, the present invention makes it possible to adjust the control time of the combustion initiation in an internal combustion engine from informations directly representative of the engine running conditions. Due to this operation in closed loop, the effect of the different phenomena occurring between the control time of the combustion initiation and the combustion itself is automatically compensated from one cycle to another.

Moreover, according to the present invention, the double mode of operation in closed loop and in open loop, while improving the performances of the engine, makes its use possible within wide running ranges without making discernible the passage from one to the other of the two operating modes.

In a first example of the method according to the invention, the control time of the combustion initiation is adjusted so that, in at least one cylinder, the time at which the pressure in this cylinder is at a maximum coincides with the time at which the drive shaft passes through a determined angular position. For identifying the instant at which the pressure is maximum, there is detected the accelerations to which the cylinder head is subjected and a first signal representative of said accelerations is delivered.

According to a particular embodiment of the invention, the first signal is integrated to obtain a second signal whose value is zero when the pressure is at a maximum in the cylinder.

According to a second embodiment of this method, the second signal is integrated to obtain a third signal whose value is at a maximum at the instant at which the pressure is at a maximum in the cylinder.

By experiment, it has been ascertained that, the combustion conditions in the cylinder being variable, the determination of the maximum pressure in the different cylinders of the engine has a certain aleatory character, due either to the fact that said detection does not occur for every cycle of operation of the engine, for example, as a result of an insufficient sensitivity of the sensor over the entire measuring range, or that said detection is not representative of the operation of the cylinder.

In these conditions, the adjustment of the control time of the combustion initiation could be unsatisfactory. The improved method of operation according to the invention permits coping therewith.

In a second example, the method for adjusting the control time of the combustion initiation consists in identifying, during the combustion in at least one cylinder of an engine, the angular position of the drive shaft at which the value of the ratio between the volume of burnt gases to the total gas volume in the cylinder attain a fixed value, and to modify the adjustment of the control time of the combustion initiation so that the identified position of the driving shaft coincides with a predetermined angular position. The ratio of the volume of the burnt gases to the total gas volume in the cylinder may be estimated from the detection of the flame front.

According to a particular embodiment of this method, in at least one cylinder, the passage of the flame front (i.e. of the interface burnt gases fresh gases) in a reference position is detected and the control time of the combustion initiation is so modified as to make its passage coincide with the passage of the drive shaft in a predetermined angular position.

Usually, the flame front is detected by means of an ionization probe which must then deliver a charasteristic signal when the drive shaft position is within two limits defining an "angular range" as indicated, for example, in the previously mentioned French Pat. No. 2,432,097. This detection may also be achieved by means of a thermometer probe of low response time or with a radiation sensor.

Experience has shown that, the combustion in the cylinder being variable, the detection of the flame front of an ionization probe within said "angular range" has a certain aleatory character, either because this detection is not effected for all the running cycles of the engine, for example, as a result of the absence of combustion, or because it is not considered as representative of the operation in the cylinder. In these conditions, the adjustment of the control time of the combustion initiation could be unsatisfactory. The improved method according to the invention permits coping therewith.

According to an alternative embodiment of the method of the invention, applied to a spark-ignition engine, the control time of the combustion initiation is imperatively modified as soon as knock occurs, at least in the cylinder where knock has been detected, in order to eliminate it. The control time of the combustion initiation will then be adjusted according to methods known in the art such as that described in the French Pat. No. 2,337,261 or the U.S. Pat. No. 4,211,194.

BRIEF DESCRIPTION OF THE DRAWING

The method according to the present invention is described hereinafter with reference to the accompanying drawing which refer, only by way of example, to the case of an engine with four cylinders A, B, C and D, not shown. The circuits associated with a particular cylinder are given in this figure the same reference letter a, b, c or d as this cylinder.

DETAILED DISCUSSION OF THE INVENTION

The engine is equipped with sensors 64a to 64d delivering a measurement signal in relation with a characteristic phenomenon of the engine running conditions.

This signal is then processed and optionally re-shaped by circuits 65a to 65d. The circuits may also decide the validation or invalidation of the measurement by application of presept criteria such as for example as the amplitude of the signal, the shape of the signal, etc.

Thus, for example, in the case where the characteristic phenomenon of the engine running conditions is the maximum pressure, the engine is equipped with means capable to measure it in each cylinder. For example, but not limitatively, the cylinder head is equipped with four sensors such as accelerometers 64a to 64d which each deliver a signal representative of the accelerations to which the cylinder head is subjected at the vicinity of the given cylinder. The signal produced by each accelerometer is transmitted to an analysis circuit 65a to 65d.

The four accelerometers 64a to 64d may be replaced by a single accelerometer judiciously located on the cylinder head, the signal delivered by said accelerometer being selectively supplied to one of the analysis circuits in accordance with the angular position of the crankshaft.

Each circuit 65a to 65d delivers a characteristic signal when the pressure in the concerned cylinder is maximum. This characteristic signal, (not shown), is re-shaped by a proper circuit which delivers, for example, a pulse when the pressure in the cylinder is maximum.

In the case where the phenomenon retained as characterizing the running conditions of the engine is the passage of the flame front through a reference position, each cylinder of the engine is equipped with the ionization probe 64a, 64b, 64c and 64d which emits a signal at each passage of the flame front through the reference position. The signal from each probe is an analog signal which is converted to a logic signal by an analog-logic converter 65a, 65b, 65c and 65d.

The signal from each circuit 65a to 65d is supplied to a circuit 66a, 66b, 66c or 66d, which detects the angular position of the drive shaft at which occurs the corresponding characteristic signal and delivers a signal representative of said position. The operation of each of the angular detection circuits 66a to 66d is synchronized by a clock 67 which is, for example, of the type described in French Pat. No. 2,404,121.

A circuit 68, associated with clock 67, successively validates the signals transmitted by each circuit 66a to 66d within a determined angular interval of rotation of the driving shaft wherein the concerned analysis circuits 65a to 65d is liable to deliver its signal.

The signal produced by each of the angular detection circuits 66a to 66d is supplied to a processing circuit 69a to 69d respectively.

Each processing circuit is adapted, at each cycle of operation of the corresponding cylinder, to deliver a reference signal after having sucessively:

(a) determined a statistical value representative of the different angular values of the crankshaft position for which the ionization probe has delivered a predetermined number P of signals for a number Q of running cycles, (b) taken the statistical value, if any, representative of the different angular values of the crankshaft position determined by one of the processing circuits corresponding to the other cylinders, when after Q operating cycles the number of delivered signals remains lower than P, and (c) elaborated a reference signal representative of the statistical value determined as indicated in step a or b said reference signal being used to control the ignition advance as indicated hereinafter.

According to another embodiment of the invention, permitting a more rapid adaptation of the control time of the combustion initiation to the running conditions of the engine, each processing circuit is adapted, at each operating cycle of the corresponding cylinder, to deliver a reference signal after having successively:

(a) determined a statistical value representative of the different angular values of the crankshaft position at which the analysis circuit has delivered a predetermined number of signals P, for a number of running cycles smaller than the value Q, or equal to the value Q, (b) taken the statistical value, if any, representative of the different angular values of the crankshaft position determined by one of the processing circuits corresponding to the other cylinders, when after Q operating cycles the number of signals remains lower than P, and (c) elaborated a reference signal representative of the statistical value determined as indicated in steps a or b, said reference signal being used for controlling the ignition advance as indicated hereinafter.

The values of P and Q are determined for each type of engine so as to obtain a satisfactory operation thereof, and are optionally dependent on the running conditions of the engine. By way of example, for a spark-ignition engine having a power of 78 kW equipping a car, excellent results have been obtained with the following values:

$$P=8 \text{ and } Q=16$$

Moreover, during these tests, a processing circuit corresponding to a first cylinder of the engine was so designed as to take, when necessary, the statistical value determined, according to the above indicated process of step a, by the processing circuit corresponding to the cylinder where the ignition took place the most recently.

The reference signal delivered by each processing circuit 69a to 69d is transferred to a circuit, 70a to 70d respectively, adapted to determine an ignition advance value such that the analysis circuit delivers its characteristic signal for a determined position of the crankshaft and to deliver a main control signal for adjusting the advance to said value.

This main control signal, transmitted by a selector circuit 71, the usefulness of which will be made apparent hereinafter, actuates either a high voltage generator 72 which, through a distribution 73, feeds the corresponding spark plug in the case of a spark-ignition engine, or the injectors, optionally through a proper device for re-shaping the signal and controlling the injectors, in the case of a compression-ignition engine.

Thus, under normal running conditions, the control moment of the combustion initiation is determined on the basis of the detection of the maximum pressure in at least one of the cylinders of the engine, i.e., for each cylinder, the advance is set in such a manner that the characteristic phenomenon of the engine running conditions occurs in a determined angular position of the driving shaft.

However, as above indicated, running conditions of the engine may occur at which no main control signal is delivered for circuits 70. This is particularly the case when starting the engine or when the number of delivered signals is lower than P for all the cylinders of the engine, or still when the detectors 64a and 64d do not deliver any signal or as a result of the breaking of the electric conductors transmitting the detected signals.

In this case, a circuit 75 is provided for delivering a secondary control signal which corresponds to a determined advance value. This value may be constant or variable in relation with at least one parameter acting on the engine operation, such for example at the running speed of the engine, measured by a sensor 76, the charge of the engine, a characteristic temperature or pressure measurable on the engine (sensor 77), or an external parameter such as the position of the accelerator.

The circuit 75 for elaborating the secondary control signal may be of any known type and does not require a detailed description. By way of example, in the case of a spark-ignition engine, a circuit of this type equipping some RENAULT cars is sold in the market under the reference RENIX S 100001-001.

The secondary control signal is transmitted to the selector circuit 71.

Similarly, a security circuit is provided for elaborating a prioritary control signal when particular running conditions of the engine occur and are detected by a suitable sensor 78. For example, but not limitatively, in the case of a spark-ignition engine, the sensor 78 delivers a signal upon occurrence of a spontaneous ignition or knock phenomenon in one of the engine cylinders. The circuit 74 elaborates a priority control signal modifying the ignition advance until the knock is eliminated. This circuit may be of any known type such as, for example, that described in the U.S. Pat. No. 4,120,272.

The prioritary control signal is transmitted to the selector circuit 71.

The circuit 71 selects at any time from the main control signal, the secondary control signal and the prioritary control signal, that particular signal which will control the combustion initiation by acting on the high voltage generator 72, which, through the distributor 73, successively feeds the spark plugs (not shown) of the engine, in the case of a spark-ignition engine, or by acting on the injectors, optionally through a suitable device for re-shaping the signal and controlling the injectors, in the case of a compression-ignition engine.

This selection is effected in the following manner:

(a) upon occurrence of a prioritary control signal, the selector 71 transmit the prioritary control signal either to a high voltage generator 72, in the case of a spark-ignition engine, or to injectors, optionally through a suitable device, in the case of compression-ignition engine, (b) in the absence of prioritary control signal, (b-1) the selector circuit 71 transmits the main control signal, if any, and (b-2) in the absence of main control signal, the selector circuit transmits the secondary control signal.

Preferably, the circuits designated by references 65 to 71 as originally manufactured, may include preprogrammed microprocessors or programmable microprocesors such as INTEL 8085 associated to with memories of the R.O.M. (Read-Only Memory), P.R.O.M. (programmable Read-Only Memory) or R.E.P.R.O.M. (Reprogrammable Read-Only Memory) type.

What is claimed is:

1. An improved method for the automatic control and regulation of the time of combustion initiation in an internal combustion engine having a drive shaft and comprising at least one cylinder provided with means for identifying the angular positions of the drive shaft corresponding to the occurrence of at least one event characteristic of the engine running conditions when said event and its detection has an aleatory character, the improvement comprising, for said at least one cylinder, measuring the angular position of the drive shaft at the moment at which said event occurs to obtain a number P of validated measurements, then, when at least a number P of validated measurements has been obtained during a number of cycles at most equal to a predetermined value Q, determining a statistical angular value representative of the validated measurements and, from said statistical value, generating and transmitting to the control means a signal representative of a modified value of the time of combustion initiation, so that said statistical value is equal to a predetermined value V, and wherein the value of P, Q and V is a value determined from at least one parameter having an effect on the engine running conditions.

2. An improved method for the automatic control and regulation of the time of combustion initiation in an internal combustion engine having a drive shaft and comprising several cylinders at least one of which being provided with means for identifying the angular positions of the drive shaft corresponding to the occurrence of at least one event characteristic of the engine running conditions when said event and its detection has an aleatory character, the improvement comprising, for said at least one cylinder, measuring the angular position of the drive shaft at the moment at which said event occurs, to obtain a number P of validated measurements, then, when at least a number P of validated measurements has been obtained during a number of cycles at most equal to a predetermined value Q, determining a statistical angular value representative of the validated measurements, and, from said statistical value, generating and transmitting to the control means a signal representative of a modified value of the time of combustion initiation, so that said statistical value is equal to a predetermined value V, and wherein the values of P, Q and V are one of a fixed value, or a value determined from at least one parameter having an effect on the engine running conditions, and further comprising using the statistical value generated from the measurements effected on said cylinder to determine the modified value of the time of combustion initiation in at least another cylinder not equipped with the means for detecting said event or for which the number of validated measurements of said event has been lower than P during Q cycles.

3. An improved method for the automatic control and regulation of the time of combustion initiation in an internal combustion engine having a drive shaft and comprising several cylinders, at least two of which are equipped with detection means for identifying the angular positions of the drive shaft corresponding to the occurrence of at least one event characteristic of the engine running conditions when said event and its detection has an aleatory character, the improvement comprising, for each cylinder equipped with the detection means, measuring the angular position of the drive shaft at the moment at which said event occurs to obtain a number P of validated measurements, then, when at least a number P of validated measurements has been obtained during a number of cycles at most equal to a predetermined value Q, determining a statistical angular value representative of the validated measurements, and, from said statistical value, generating and transmitting to the control means a signal representative of a modified value of the time of combustion initiation, so that said statistical value is equal to a predetermined value V, and wherein the values of P, Q and V are one of a fixed value, or a value determined from at least one parameter having an effect on the engine running conditions, and further comprising using one of the said statistical values to determine the modified value of the time of the combustion initiation in the cylinders not equipped with the means for detecting said event or for which the number of validated measurements of said event has been lower than P during Q cycles, and still further comprising when, in each of the cylinders equipped with detection means, the number of validated measurements of said event characteristic of the running conditions of the engine is lower than P during Q cycles, the time of the combustion initiation is given a preselected value or a value determined in relation with the value taken by at least one parameter affecting the operation of the engine, comprising the running speed of the engine, the charge of the engine, a temperature or a pressure measurable on the engine, the nature of the fuel or an external parameter comprising the position of the accelerator.

4. An improved method for the automatic control and regulation of the time of combustion initiation in an internal combustion engine having a drive shaft and comprising at least one cylinder provided with means for identifying the angular positions of the drive shaft corresponding to the occurrence of at least one event characteristic of the engine running conditions when said event and its detection has an aleatory character, and comprising, for said at least one cylinder, measuring the angular position of the drive shaft at the moment at which said event occurs to obtain a number P of validated measurements, then, when at least a number P of validated measurements has been obtained during a number of cycles at most equal to a predetermined value Q, determining a statistical angular value representative of the validated measurements, and, from said statistical value, generating and transmitting to the control means a signal representative of a modified value of the time of combustion initiation, so that said statistical value is equal to a predetermined value V, and wherein said predetermined value V, the number P or the number Q are values depending on at least one parameter having an effect on the engine running conditions, said parameter being one of the running speed, the charge, the noise, the pollutant content of the exhaust gases, the nature of the fuel, and the temperature of the engine.

5. An improved method for the automatic control and regulation of the time of combustion initiation in an internal combustion engine having a drive shaft and comprising at least one cylinder provided with means for identifying the angular positions of the drive shaft corresponding to the occurrence of at least one event characteristic of the engine running conditions when said event and its detection has an aleatory character, and comprising, for said at least one cylinder, measuring the angular position of the drive shaft at the moment at which said event occurs to obtain a number P of validated measurements, then, when at least a number P of validated measurements has been obtained during a number of cycles at most equal to a predetermined value Q, determining a statistical angular value representative of the validated measurements, and, from said statistical value, generating and transmitting to the control means a signal representative of a modified value of the time of combustion initiation, so that said statistical value is equal to a predetermined value V, and when, in each of the cylinders equipped with detection means, the number of validated measurements of said event characteristic of the running conditions of the engine is lower than P during Q cycles, the time of combustion initiation is given a preselected value.

6. An improved method for the automatic control and regulation of the time of combustion initiation in an internal combustion engine having a drive shaft and comprising at least one cylinder provided with means for identifying the angular position of the drive shaft corresponding to the occurrence of at least one event characteristic of the engine running conditions when said event and its detection has an aleatory character, and comprising, for said at least one cylinder, measuring the angular position of the drive shaft at the moment at which said event occurs to obtain a number P of validated measurements, then, when at least a number P of validated measurements has been obtained during a number of cycles at most equal to a predetermined value Q, determining a statistical angular value representative of the validated measurements, and, from said statistical value, generating and transmitting to the control means a signal representative of a modified value of the time of combustion initiation, so that said statistical value is equal to a predetermined value V, and wherein said value V, the number P or the number Q is a fixed value, and said method being applied to an engine comprising several cylinders, at least two of which are equipped with detection means, and comprising using the statistical value elaborated for at least one of the cylinders equipped with the detection means for controlling the combustion initiation time in another cylinder, said another cylinder being one of a cylinder not equipped with detection means or for which the number of validated measurements of said event has been lower than P during Q cycles.

7. A method according to claim 5, wherein said preselected value of the time of combustion initiation is determined in relation with the value taken by at least one parameter affecting the operation of the engine, said at least one parameter being the running speed of the engine, the charge of the engine, a temperature or a pressure measurable on the engine, the nature of the fuel or an external parameter comprising the position of the accelerator.

8. A method according to claim 7, characterized in that the phenomenon characteristic of the running conditions of the engine is the maximum pressure in the cylinders.

9. A method according to claim 4, applied to an engine comprising several cylinders, at least two of which are equipped with detection means, comprising using the statistical value elaborated for at least one of the cylinders equipped with the detection means for controlling the combustion initiation time in another cylinder, said another cylinder being one of a cylinder not equipped with detection means or for which the number of validated measurements of said phenomenon has been lower than P during Q cycles.

10. A method according to claim 5, applied to an engine comprising several cylinders, at least two of which are equipped with detection means, comprising using the statistical value elaborated for at least one of the cylinders equipped with the detection means for controlling the combustion initiation time in another cylinder, said another cylinder being one of a cylinder not equipped with detection means or for which the number of validated measurements of said phenomenon has been lower than P during Q cycles.

11. A method according to claims 4, 5, 9 or 10, characterized in that the phenomenon characteristic of the running conditions of the engine is the passage of the flame front through a reference position of the combustion chamber.

12. A method according to claims 1, 2, 3 or 4 applied to a spark-ignition engine provided with knock sensing means, and comprising, upon occurrence of the knock, imperatively modifying the ignition advance, at least in the cylinder where the knock has been detected, in order to eliminate the knock.

13. A method according to claim 4, applied to a spark-ignition engine provided with knock sensing means and comprising, upon occurrence of the knock, imperatively modifying the ignition advance, at least in the cylinder where the knock has been detected, in order to eliminate the knock.

14. A method according to claim 5, applied to a spark-ignition engine provided with knock sensing means and comprising, upon occurrence of the knock, imperatively modifying the ignition advance, at least in the cylinder where the knock has been detected, in order to eliminate the knock.

15. A method according to claim 4 wherein said at least one event characteristic of the engine running conditions is one of the maximum pressure in the cylinder or the passage of the flame front through a reference position in the combustion chamber.

16. A method according to claim 12 characterized in that the event characteristic of the running conditions of the engine is the passage of the flame front through a reference position of the combustion chamber.

* * * * *